(12) United States Patent
Qian et al.

(10) Patent No.: US 8,620,277 B2
(45) Date of Patent: Dec. 31, 2013

(54) METHOD AND DEVICE FOR BACKING UP UNREAD SHORT MESSAGE

(75) Inventors: Meng Qian, Shenzhen (CN); Lei Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/637,515

(22) PCT Filed: Dec. 20, 2010

(86) PCT No.: PCT/CN2010/080022
§ 371 (c)(1),
(2), (4) Date: Sep. 26, 2012

(87) PCT Pub. No.: WO2011/116616
PCT Pub. Date: Sep. 29, 2011

(65) Prior Publication Data
US 2013/0023242 A1 Jan. 24, 2013

(30) Foreign Application Priority Data
Mar. 26, 2010 (CN) .......................... 2010 1 0133106

(51) Int. Cl.
| | |
|---|---|
| H04M 1/725 | (2006.01) |
| H04M 11/04 | (2006.01) |
| H04M 3/42 | (2006.01) |
| H04M 1/24 | (2006.01) |
| H04M 15/00 | (2006.01) |
| H04M 7/00 | (2006.01) |
| H04W 4/00 | (2009.01) |
| H04W 24/00 | (2009.01) |
| H04L 12/54 | (2013.01) |

(52) U.S. Cl.
USPC .................. 455/412.1; 455/404.1; 455/404.2; 455/412.2; 455/414.1; 455/456.1; 455/466; 370/428; 379/9.05; 379/112.02; 379/221.04

(58) Field of Classification Search
USPC ............. 455/412.1, 404.2, 411, 404.1, 412.2, 455/414.1, 422.1, 556.2, 558, 466, 557, 455/456.1; 370/338, 351, 389, 401, 428, 370/466; 380/247, 270; 379/9.05, 112.02, 379/221.04
See application file for complete search history.

(56) References Cited

U.S. PATENT DOCUMENTS 5,687,216 A * 11/1997 Svensson .................... 455/412.2
7,542,772 B2 * 6/2009 Jun ............................... 455/466

(Continued)

FOREIGN PATENT DOCUMENTS

| | | |
|---|---|---|
| CN | 1402573 | 3/2003 |
| CN | 1856138 | 11/2006 |

(Continued)

OTHER PUBLICATIONS

International Search Report for International Patent Application No. PCT/CN2010/080022, mailed Mar. 31, 2011.

*Primary Examiner* — Inder Mehra
(74) *Attorney, Agent, or Firm* — McAndrews Held & Malloy, Ltd.

(57) ABSTRACT

The present invention provides a method and a device for backing up an unread short message, both of which can store a new short message received by a mobile communication terminal in a terminal storage and back up the new short message to a subscriber identity card, and delete, when a user reads or deletes an unread short message stored in the terminal storage, a backup unread short message, which stored in the subscriber identity card, corresponding to the new short message. The method and the device of the present invention can synchronize the unread short message in the terminal storage and the subscriber identity card, so that the user will not lose the unread short message even when changing the mobile communication terminal.

17 Claims, 6 Drawing Sheets

(56) References Cited

U.S. PATENT DOCUMENTS

2007/0060206 A1* 3/2007 Dam Nielsen et al. ....... 455/566
2011/0263296 A1* 10/2011 Baietto et al. ................. 455/558

FOREIGN PATENT DOCUMENTS

| CN | 1863352 | 11/2006 |
| KR | 20050007736 | 1/2005 |

* cited by examiner

METHOD AND DEVICE FOR BACKING UP UNREAD SHORT MESSAGE

FIELD OF THE INVENTION

The present invention relates to the technical field of short message application of mobile communication terminals, and in particular to a method and a device for backing up an unread short message.

BACKGROUND OF THE INVENTION

Short Message Service (SMS), as a service for a mobile communication terminal, enables the mobile communication terminal such as cell phone with voice transfer function to become a telegraphic interpretation tool, thereby sparing ears and making texts demonstrate a bigger role. The SMS, as a way of transferring information and communicating by texts, makes thumb sensitive and developed and gives mouth a rest, thus the modern telecommunication service embodies dual features of technique and culture. The SMS has been widely used and is rapidly developed particularly in China in recent years. The SMS appears in many industries.

At present, in the development of the short message application of the mobile communication terminal, as shown in FIG. 1, there are two modes for reporting a new short message through a new short message notification setting command AT+CNMI after a protocol stack of Terminal Equipment (TE) receives the new short message from a network side. The first mode is that: after the short message is stored in a terminal storage or in a subscriber identity card, and then an index number is reported to a short message management control module, wherein the subscriber identity card comprises a Subscriber Identity Module (SIM) card and a Universal Subscriber Identity Module (USIM) card which is applied to the 3G network. The second mode is that: the short message is not stored in the protocol stack, the content of the short message is directly reported to the short message management control module; after the short message management control module receives the new short message, a user determines through a user interface whether to store the short message in the subscriber identity card or in the terminal storage, even in the network.

Due to the capacity limit or performance influence of the storage and the subscriber identity card regulated by a 3GPP protocol, the mobile communication terminal adopting the first mode does not have a good user experience. In the second mode, the storage solution can be flexibility controlled, because the storage solution has two options: storing the short message in the terminal storage or in the subscriber identity card; however, if the new short message is selected to be stored in the subscriber identity card, the capacity limit and the performance influence of the subscriber identity card would exist too, and the user experience is poor.

If the new short message is selected to be stored in the terminal storage, although the capacity of the terminal storage is relatively big, after a user receives the reporting of a new short message, stores the new short message and sends a storage success response to the network side, if due to some reason, for example, terminal out of battery and other exceptions, the user probably needs to replace the mobile communication terminal but still uses the original subscriber identity card, at this moment, the user would lose the new short message just received. For this condition, there is no good solution so far.

SUMMARY OF THE INVENTION

The present invention provides a method and a device for backing up an unread short message, which can synchronize the unread short message in a terminal storage and in an subscriber identity card, so that a user will not lose the unread short message even when changing a mobile communication terminal The technical solution of the present invention is realized as follows.

The present invention provides a method for backing up an unread short message, which comprises:

storing a new short message received by a mobile communication terminal in a terminal storage and backing up the new short message to a subscriber identity card; and when a user reads or deletes an unread short message stored in the terminal storage, deleting a backup unread short message, which is stored in the subscriber identity card, corresponding to the new short message.

The step of storing the new short message in the terminal storage and backing up the new short message to the subscriber identity card comprises:

when the mobile communication terminal receives the new short message, writing the new short message in the terminal storage based on a state of a received unread short message, and then writing the new short message in the subscriber identity card based on a state of a stored backup unread short message; or when the mobile communication terminal receives the new short message, after writing the new short message in the terminal storage based on the state of the received unread short message, first judging whether a capacity of the subscriber identity card is sufficient, if so, writing the new short message in the subscriber identity card based on the state of the stored backup unread short message; otherwise, giving up backup.

After deleting the backup unread short message, the method further comprises:

modifying a state of the unread short message stored in the terminal storage as a received read short message.

The method further comprises: periodically performing an operation of initialization synchronization on the unread short message in the terminal storage and in the subscriber identity card when the mobile communication terminal is powered on or powered off or when the mobile communication terminal is in an idle or standby mode, wherein the operation comprises:

step 1: reading an unread short message stored in the subscriber identity card and reading all short messages in the terminal storage;

step 2: matching, in terms of content, the unread short message stored in the subscriber identity card with all the short messages stored in the terminal storage one by one, if no short message of the same content is found, setting a state of the unread short message stored in the subscriber identity card as a received unread short message; if a short message of the same content is found, going to step 3;

step 3: in a short message of the same content, judging whether a state of the short message in the terminal storage is unread, if so, setting the state of the unread short message stored in the subscriber identity card as a stored backup unread short message; otherwise, deleting the unread short message stored in the subscriber identity card.

Before the mobile communication terminal receives the new short message, the method further comprises:

establishing a corresponding table of an index relationship between a storage index of a short message in the terminal storage and a backup index of a short message in the subscriber identity card, for searching for a new short message stored in the subscriber identity card.

The present invention provides a device for backing up an unread short message, comprising:

a backup module, configured to store a new short message received by a mobile communication terminal in a terminal storage and back up the new short message to an subscriber identity card; and a synchronization module, configured to delete, when a user reads or deletes an unread short message stored in the terminal storage, a backup unread short message, which is stored in the subscriber identity card, corresponding to the new short message.

The device further comprises:

an index relationship establishment module, configured to establish a corresponding table of an index relationship between a storage index of a short message in the terminal storage and a backup index of a short message in the subscriber identity card, for searching for a new short message stored in the subscriber identity card.

The device further comprises:

an initialization synchronization module, configured to periodically perform initialization synchronization on the unread short message in the terminal storage and in the subscriber identity card when the mobile communication terminal is powered on or powered off or when the mobile communication terminal is in an idle or standby mode;

the initialization synchronization module comprises:

a reading module, configured to: read an unread short message stored in the subscriber identity card and read all short messages in the terminal storage;

a content matching module, configured to: match, in terms of content, the unread short message stored in the subscriber identity card with all the short messages stored in the terminal storage one by one; if no short message of the same content is found, set a state of the unread short message stored in the subscriber identity card as a received unread short message; if a short message of the same content is found, send the short message to a state matching module; and the state matching module, configured to: judge, in the short message of the same content, whether a state of the short message in the terminal storage is unread; if so, set the state of the unread short message stored in the subscriber identity card as a stored backup unread short message; otherwise, delete the unread short message stored in the subscriber identity card.

The reading module is further configured to acquire a capacity of the subscriber identity card, comprising a total capacity and an unused capacity;

the backup module is further configured to: after storing the new short message received by the mobile communication terminal in the terminal storage, first judge whether the capacity of the subscriber identity card is sufficient; if so, back up the new short message to the subscriber identity card; otherwise, give up backup.

The present invention provides a mobile communication terminal with a function of backing up an unread short message, comprising: a protocol stack, a short message management control module, a user interface, a subscriber identity card and a terminal storage, wherein the short message management control module comprises:

a backup module, configured to store a new short message received by the mobile communication terminal in the terminal storage and back up the new short message to the subscriber identity card; and a synchronization module, configured to delete, when a user reads or deletes an unread short message stored in the terminal storage, a backup unread short message stored in the subscriber identity card corresponding to the new short message.

The present invention provides a mobile communication terminal with a function of backing up an unread short message, comprising: a protocol stack, a short message management control module, a user interface, a subscriber identity card and a terminal storage, wherein the short message management control module comprises:

an initialization synchronization module, configured to periodically perform initialization synchronization on an unread short message in the terminal storage and in the subscriber identity card when the mobile communication terminal is powered on or powered off or when the mobile communication terminal is in an idle or standby mode;

an index relationship establishment module, configured to establish a corresponding table of an index relationship between a storage index of a short message in the terminal storage and a backup index of a short message in the subscriber identity card;

a backup module, configured to store a new short message received by the mobile communication terminal in the terminal storage and back up the new short message to the subscriber identity card, and meanwhile establish a new item in the corresponding table of the index relationship; and a synchronization module, configured to delete, when a user reads or deletes an unread short message stored in the terminal storage, a backup unread short message stored in the subscriber identity card corresponding to the new short message according to the corresponding table of the index relationship.

By adopting the technical solution above, the present invention at least has advantages as follows.

The method and the device provided by the present invention for backing up an unread short message actually are an improvement made to the function of a short message management control module in the conventional art. In the method and the device, the unread short message stored in the terminal storage is backed up to the subscriber identity card, when a user reads or deletes the unread short message stored in the terminal storage, the subscriber identity card is synchronized. The technical solution of the present invention is a function supplement for the receiving and storing process of a short message in the 3GPP protocol, and implements the backup of an unread short message by a method of extending the state bit of the short message, that is, adding the state of a stored backup unread short message when writing the short message, wherein the backup is transparent for a user. The present invention prompts the unread short message a user cares mostly to the user to the greatest extent allowed by the capacity of the subscriber identity card, so that the user will not miss the unread short message even when changing the mobile communication terminal, thereby improving the user experience. The present invention first writes the received short message in the terminal storage by default, since the terminal storage generally can be extended, the user is least limited by the capacity limit of the storage space when normally storing a short message.

DETAILED DESCRIPTION OF THE EMBODIMENTS

To further illustrate the technical means adopted by the present invention and the effects achieved by the present invention, the method and the device provided by the present invention for backing up an unread short message are illustrated below in detail in conjunction with accompanying drawings and preferable embodiments.

Figure 1:
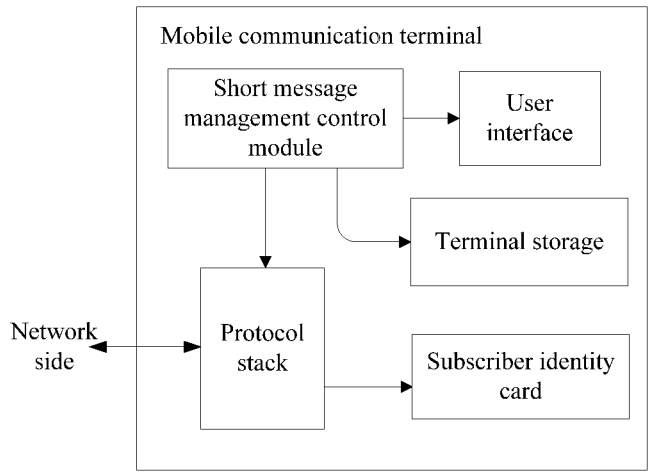
FIG. 1 shows a diagram of relevant modules of a mobile communication terminal for processing a short message in a conventional art.
Figure 2:
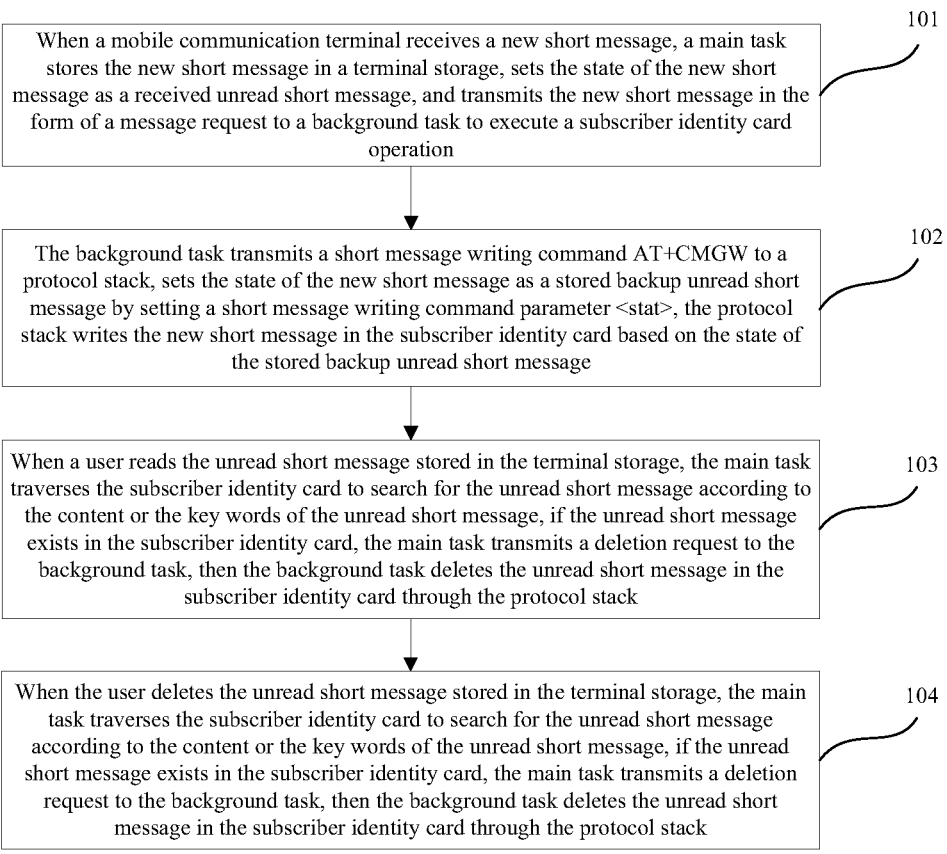
FIG. 2 shows a flowchart of a method for backing up an unread short message in an Embodiment 1 of the present invention.

In an Embodiment 1 of the present invention, as shown in FIG. 2, the method for backing up an unread short message comprises the following steps.

Step 101: when a mobile communication terminal receives a new short message, a main task stores the new short message in a terminal storage, sets a state of the new short message as a received unread short message, and transmits the new short message in the form of a message request to a background task to execute a subscriber identity card operation.

It should be noted that the main task does not need to wait for the actual result about the card operation executed by the background task; therefore, the efficiency of a control management module can be greatly improved and the user experience is improved too.

Step 102: the background task transmits a short message writing command AT+CMGW to a protocol stack, and sets the state of the new short message as a stored backup unread short message by setting a short message writing command parameter <stat>; the protocol stack writes the new short message in the subscriber identity card based on the state of the stored backup unread short message.

It should be noted that the short message state corresponding to the parameter <stat> of the short message writing command AT+CMGW regulated in the existing 3GPP protocol comprises: a received unread short message, a received read short message, a stored unsent short message, a stored sent short message, and all short messages. In order to distinguish the special state of the backup unread short message, the embodiment of the present invention extends the parameter <stat> of the short message writing command AT+CMGW regulated in the 3GPP protocol and particularly adds the state of a stored backup unread short message.

Step 103: when a user reads an unread short message stored in the terminal storage, the main task traverses the subscriber identity card to search for the unread short message according to the content or the key words of the unread short message, if the unread short message exists in the subscriber identity card, the main task transmits a deletion request to the background task, then the background task deletes the unread short message in the subscriber identity card through the protocol stack. Preferably, the state of the unread short message in the terminal storage is changed from a received unread short message to a received read short message.

Step 104: when the user deletes the unread short message stored in the terminal storage, the main task traverses the subscriber identity card to search for the unread short message according to the content or the key words of the unread short message, if the unread short message exists in the subscriber identity card, the main task transmits a deletion request to the background task, then the background task deletes the unread short message in the subscriber identity card through the protocol stack.

In this embodiment, Step 103 and Step 104 do not have strict order.

Figure 3:
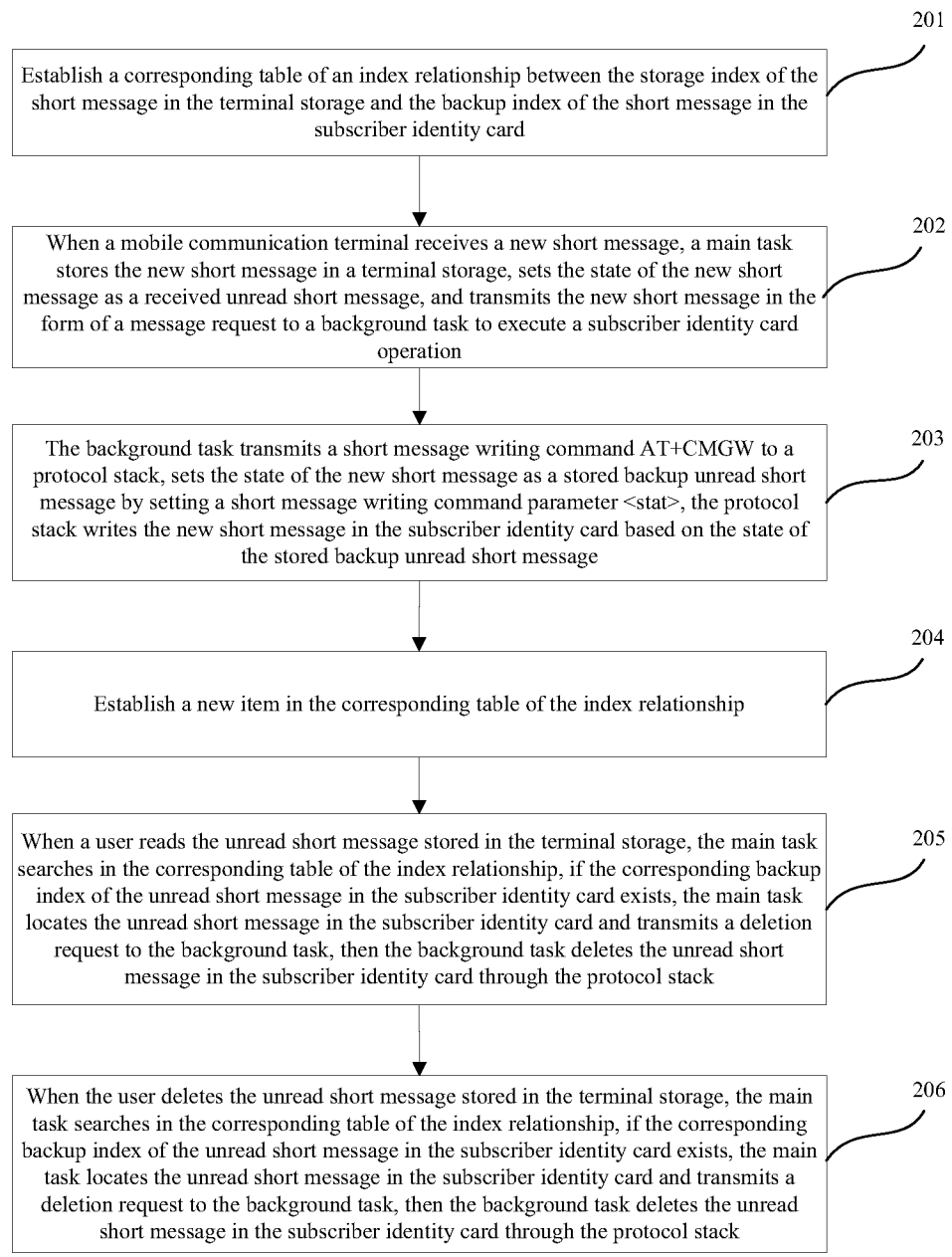
FIG. 3 shows a flowchart of a method for backing up an unread short message in an Embodiment 2 of the present invention.

In an embodiment 2 of the present invention, as shown in FIG. 3, the method for backing up an unread short message comprises the following steps.

Figure 4:
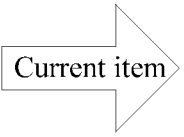
FIG. 4 shows a diagram of the state of a corresponding table of an index relationship before a new item is added in an embodiment of the present invention.

Step 201: in order to facilitate synchronization of a backup unread short message and to shorten the time of searching for a short message in the subscriber identity card, a corresponding table of an index relationship between a storage index of the short message in a terminal storage and a backup index of the short message in a subscriber identity card is established, as shown in FIG. 4.

Step 202: when a mobile communication terminal receives a new short message, a main task stores the new short message in the terminal storage, sets the state of the new short message as a received unread short message, and transmits the new short message in the form of a message request to a background task to execute a subscriber identity card operation.

It should be noted that the main task does not need to wait for the actual result about the card operation executed by the background task; therefore, the efficiency of a control management module can be greatly improved and the user experience is improved too.

Step 203: the background task transmits a short message writing command AT+CMGW to a protocol stack, and sets the state of the new short message as a stored backup unread short message by setting a short message writing command parameter <stat>; the protocol stack writes the new short message in the subscriber identity card based on the state of the stored backup unread short message.

It should be noted that the short message state corresponding to the parameter <stat> of the short message writing command AT+CMGW regulated in the existing 3GPP protocol comprises: a received unread short message, a received read short message, a stored unsent short message, a stored sent short message, and all short messages. In order to distinguish the special state of the backup unread short message, the embodiment of the present invention extends the parameter <stat> of the short message writing command AT+CMGW regulated in the 3GPP protocol and particularly adds the state of a stored backup unread short message.

Step 204: a new item is established in the corresponding table of the index relationship, wherein the specific process of establishing the new item comprises the following steps a, b and c.

Step a: when the main task stores the new short message in the terminal storage, the main task fills the storage index of 6 in the corresponding table of the index relationship and sets the backup index to be 0xffffffff, which indicates invalid.

Step b: after the background task successfully stores the content of the new short message in the subscriber identity card through the protocol stack, search for a terminal index corresponding to the backup index of 0xffffffff in the relationship table, and perform matching on the short message in terms of content.

Matching rules comprise: taking the short message of PDU format for example, the matching can be performed by directly comparing the PDU string. If the terminal stores the short message in a text mode, the matching can be performed by comparing a few key data, for example, timestamp, source address, and the like.

Figure 5:
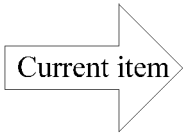
FIG. 5 shows a diagram of the state of a corresponding table of an index relationship after a new item is added in an embodiment of the present invention.

Step c: after the matching succeeds, the background task updates the backup index of 7 of the short message in the subscriber identity card to the item in the corresponding table, as shown in FIG. 5.

The function of the corresponding table of the index relationship is that: based on the storage index in the terminal storage, the backup index of the short message in the subscriber identity card can be quickly obtained, thus the locating of the short message is completed efficiently.

Step 205: when a user reads an unread short message stored in the terminal storage, the main task searches in the corresponding table of the index relationship, if the corresponding backup index of the unread short message in the subscriber identity card exists, the main task locates the unread short message in the subscriber identity card and transmits a deletion request to the background task, then the background task deletes the unread short message in the subscriber identity card through the protocol stack. Preferably, the state of the unread short message in the terminal storage is changed from a received unread short message to a received read short message, and the item in the corresponding table of the index relationship corresponding to this backup index is deleted.

Step 206: when the user deletes the unread short message stored in the terminal storage, the main task searches in the corresponding table of the index relationship, if the corresponding backup index of the unread short message in the subscriber identity card exists, the main task locates the unread short message in the subscriber identity card and transmits a deletion request to the background task, then the background task deletes the unread short message in the subscriber identity card through the protocol stack. Preferably, the item in the corresponding table of the index relationship corresponding to this backup index is deleted.

In this embodiment, Step 205 and Step 206 do not have strict order.

Figure 6:
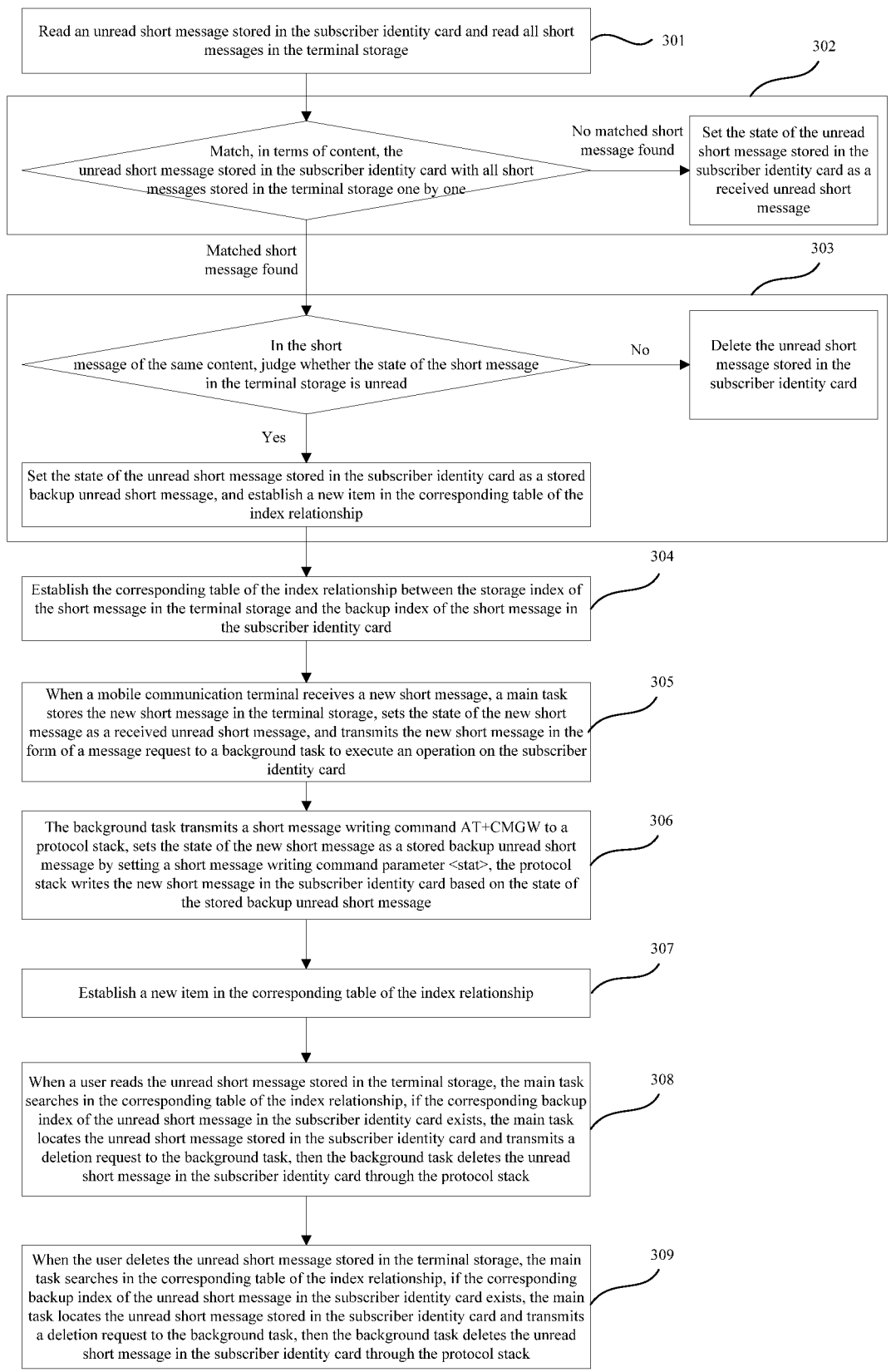
FIG. 6 shows a flowchart of a method for backing up an unread short message in an Embodiment 3 of the present invention.

In an Embodiment 3 of the present invention, as shown in FIG. 6, the method for backing up an unread short message is similar to that in the Embodiment 1, and the difference lies in that: this embodiment further comprises a step of performing initialization synchronization on the unread short message in the terminal storage and in the subscriber identity card, that is, Step 301 to Step 303 in the following context. If a user changes a mobile communication terminal frequently, if taking the initialization synchronization being performed every time the terminal is powered on for example, in this embodiment, the method for backing up the unread short message comprises the following steps.

Step 301: read an unread short message stored in the subscriber identity card and read all short messages in the terminal storage.

Step 302: the unread short message stored in the subscriber identity card is matched with all short messages stored in the terminal storage one by one in terms of content, if no short message of the same content is found, the state of the unread short message stored in the subscriber identity card is set as a received unread short message; if a short message of the same content is found, go to Step 303.

Step 303: in the short message of the same content, it is judged whether the state of the short message in the terminal storage is unread, if so, the state of the unread short message stored in the subscriber identity card is set as a stored backup unread short message, and a new item is established in the corresponding table of the index relationship; otherwise, the unread short message stored in the subscriber identity card is delete.

Step 304: in order to facilitate synchronization of a backup unread short message, a corresponding table of an index relationship between the storage index of the short message in the terminal storage and the backup index of the short message in the subscriber identity card is established, as shown in FIG. 4.

Step 305: when a mobile communication terminal receives a new short message, a main task stores the new short message in the terminal storage, sets the state of the new short message as a received unread short message, and transmits the new short message in the form of a message request to a background task to execute a subscriber identity card operation.

It should be noted that the main task does not need to wait for the actual result about the card operation of the background task; therefore, the efficiency of a control management module can be greatly improved and the user experience is improved too.

Step 306: the background task transmits a short message writing command AT+CMGW to a protocol stack, and sets the state of the new short message as a stored backup unread short message by setting a short message writing command parameter <stat>; the protocol stack writes the new short message in the subscriber identity card based on the state of the stored backup unread short message.

It should be noted that the short message state corresponding to the parameter <stat> of the short message writing command AT+CMGW regulated in the existing 3GPP protocol comprises: a received unread short message, a received read short message, a stored unsent short message, a stored sent short message, and all short messages. In order to distinguish the special state of the backup unread short message, the embodiment of the present invention extends the parameter <stat> of the short message writing command AT+CMGW regulated in the 3GPP protocol and particularly adds the state of a stored backup unread short message.

Step 307: a new item is established in the corresponding table of the index relationship, wherein the specific process of establishing the new item comprises the following steps a, b and c.

Step a: when the main task stores the new short message in the terminal storage, the main task fills the storage index of 6 in the corresponding table of the index relationship and sets the backup index to be 0xffffffff, which indicates invalid.

Step b: after the background task successfully stores the content of the new short message in the subscriber identity card through the protocol stack, search for a terminal index corresponding to the backup index of 0xffffffff in the relationship table, and perform matching on the short message in terms of content.

Matching rules comprise: taking the short message of PDU format for example, the matching can be performed by directly comparing the PDU string. If the terminal stores the short message in a text mode, the matching can be performed by comparing a few key data, for example, timestamp, source address, and the like.

Step c: after the matching succeeds, the background task updates the backup index of 7 of the short message in the subscriber identity card to the item in the corresponding table, as shown in FIG. 5.

The function of the corresponding table of the index relationship is that: based on the storage index in the terminal storage, the backup index of the short message in the subscriber identity card can be quickly obtained, thus the locating of the short message is completed efficiently.

Step 308: when a user reads an unread short message stored in the terminal storage, the main task searches in the corresponding table of the index relationship, if the corresponding backup index of the unread short message in the subscriber identity card exists, the main task locates the unread short message in the subscriber identity card and transmits a deletion request to the background task, then the background task deletes the unread short message in the subscriber identity card through the protocol stack. Preferably, the state of the unread short message in the terminal storage is changed from a received unread short message to a received read short message, and the item in the corresponding table of the index relationship corresponding to this backup index is deleted.

Step 309: when the user deletes the unread short message stored in the terminal storage, the main task searches in the corresponding table of the index relationship, if the corresponding backup index of the unread short message in the subscriber identity card exists, the main task locates the unread short message in the subscriber identity card and transmits a deletion request to the background task, then the background task deletes the unread short message in the subscriber identity card through the protocol stack. Preferably, the item in the corresponding table of the index relationship corresponding to this backup index is deleted.

It should be noted that the step of initialization synchronization is not limited to be performed when the cell phone is powered on, also can be performed when the cell phone is powered off, or can be performed regularly when the cell phone is in an idle or standby mode. In this embodiment, Step 308 and Step 309 have no strict order.

Figure 7:
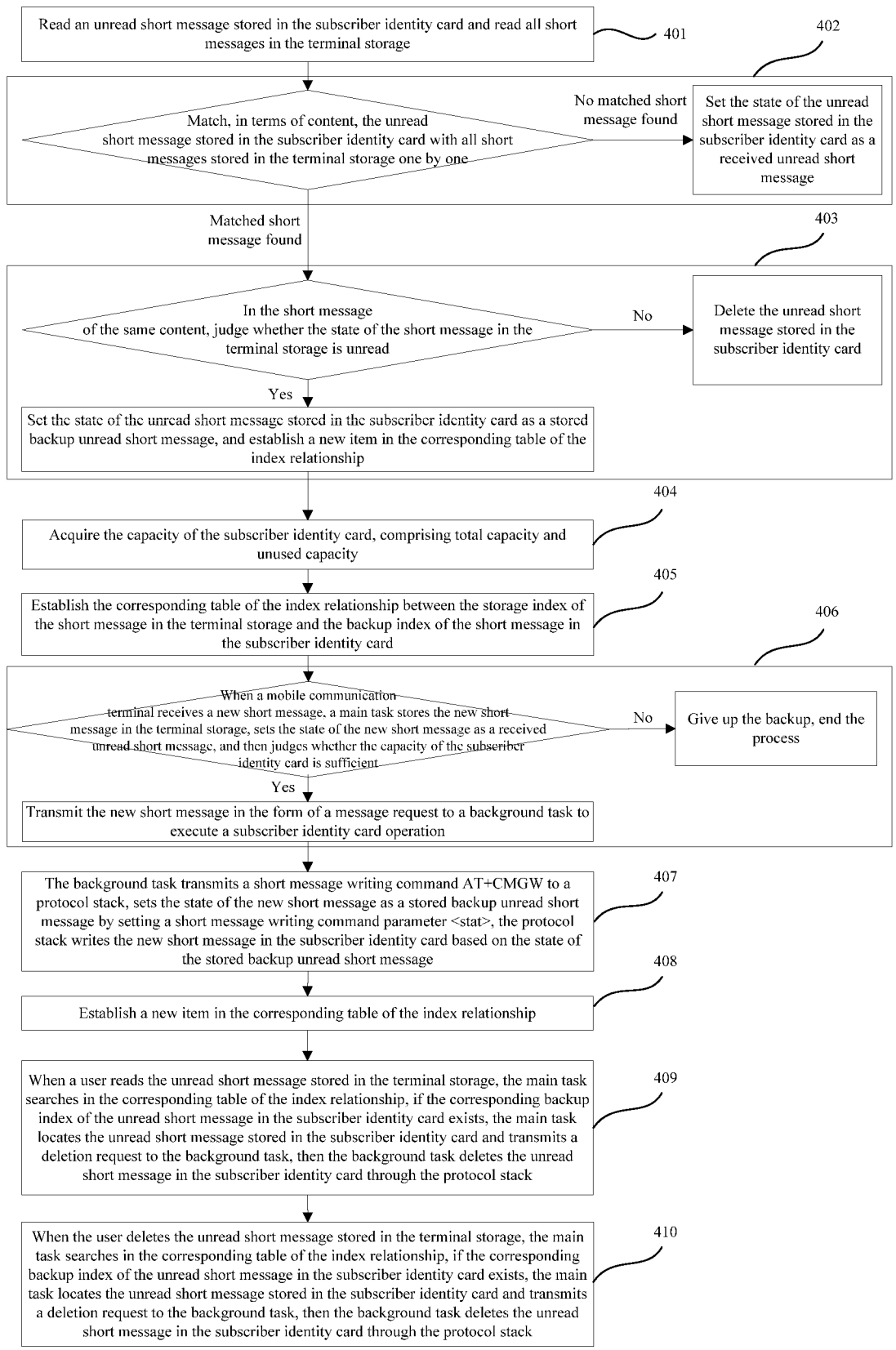
FIG. 7 shows a flowchart of a method for backing up an unread short message in an Embodiment 4 of the present invention.

In an Embodiment 4 of the present invention, as shown in FIG. 7, a method for backing up an unread short message is similar to that in the Embodiment 2, and the difference lies in that this embodiment adds, in the process of performing initialization synchronization on the unread short message in the terminal storage and in the subscriber identity card, a Step 404 of acquiring a capacity of the subscriber identity card, so as to get prepared for flexibly processing the backup operation according to the condition of capacity limit when writing the short message in the subscriber identity card in the following Step 407. This embodiment can avoid transmitting an invalid request to the subscriber identity card and reducing the operation efficiency of program. The method for backing up the unread short message comprises the following steps.

Step 401: read an unread short message stored in the subscriber identity card and read all short messages in the terminal storage.

Step 402: the unread short message stored in the subscriber identity card is matched with all short messages stored in the terminal storage one by one in terms of content, if no short message of the same content is found, the state of the unread short message stored in the subscriber identity card is set as a received unread short message; if a short message of the same content is found, go to Step 403.

Step 403: in the short message of the same content, it is judged whether the state of the short message in the terminal storage is unread, if so, the state of the unread short message stored in the subscriber identity card is set as a stored backup unread short message, and a new item is established in the corresponding table of the index relationship; otherwise, the unread short message stored in the subscriber identity card is delete.

Step 404: the capacity of the subscriber identity card, comprising total capacity and unused capacity, is acquired.

Step 405: in order to facilitate synchronization of a backup unread short message, a corresponding table of an index relationship between the storage index of the short message in the terminal storage and the backup index of the short message in the subscriber identity card is established, as shown in FIG. 4.

Step 406: when a mobile communication terminal receives a new short message, a main task stores the new short message in the terminal storage, sets the state of the new short message as a received unread short message, and then judges whether the capacity of the subscriber identity card is sufficient; if so, the main task transmits the new short message in the form of a message request to a background task to execute a subscriber identity card operation; otherwise, the main task gives up the backup and ends the process.

It should be noted that the main task does not need to wait for the actual result about the card operation of the background task; therefore, the efficiency of a control management module can be greatly improved and the user experience is improved too.

Step 407: the background task transmits a short message writing command AT+CMGW to a protocol stack, and sets the state of the new short message as a stored backup unread short message by setting a short message writing command parameter <stat>; the protocol stack writes the new short message in the subscriber identity card based on the state of the stored backup unread short message.

It should be noted that the short message state corresponding to the parameter <stat> of the short message writing command AT+CMGW regulated in the existing 3GPP protocol comprises: a received unread short message, a received read short message, a stored unsent short message, a stored sent short message, and all short messages. In order to distinguish the special state of the backup unread short message, the embodiment of the present invention extends the parameter <stat> of the short message writing command AT+CMGW regulated in the 3GPP protocol and particularly adds the state of a stored backup unread short message.

Step 408: a new item is established in the corresponding table of the index relationship, wherein the specific process of establishing the new item comprises the following steps a, b and c.

Step a: when the main task stores the new short message in the terminal storage, the main task fills the storage index of 6 in the corresponding table of the index relationship and sets the backup index to be 0xffffffff, which indicates invalid.

Step b: after the background task successfully stores the content of the new short message in the subscriber identity card through the protocol stack, search for a terminal index corresponding to the backup index of 0xffffffff in the relationship table, and perform matching on the short message in terms of content.

Matching rules comprise: taking the short message of PDU format for example, the matching can be performed by directly comparing the PDU string. If the terminal stores the short message in a text mode, the matching can be performed by comparing a few key data, for example, timestamp, source address, and the like.

Step c: after the matching succeeds, the background task updates the backup index of 7 of the short message in the subscriber identity card to the item in the corresponding table, as shown in FIG. 5.

The function of the corresponding table of the index relationship is that: based on the storage index in the terminal storage, the backup index of the short message in the subscriber identity card can be quickly obtained, thus the locating of the short message is completed efficiently.

Step 409: when a user reads an unread short message stored in the terminal storage, the main task searches in the corresponding table of the index relationship, if the corresponding backup index of the unread short message in the subscriber identity card exists, the main task locates the unread short message in the subscriber identity card and transmits a deletion request to the background task, then the background task deletes the unread short message in the subscriber identity card through the protocol stack. Preferably, the state of the unread short message in the terminal storage is changed from a received unread short message to a received read short message, and the item in the corresponding table of the index relationship corresponding to this backup index is deleted.

Step 410: when the user deletes the unread short message stored in the terminal storage, the main task searches in the corresponding table of the index relationship, if the corresponding backup index of the unread short message in the subscriber identity card exists, the main task locates the unread short message in the subscriber identity card and transmits a deletion request to the background task, then the background task deletes the unread short message in the subscriber identity card through the protocol stack. Preferably, the item in the corresponding table of the index relationship corresponding to this backup index is deleted.

In this embodiment, Step 409 and Step 410 do not have strict order.

Figure 8:
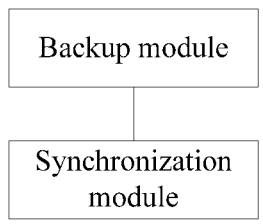
FIG. 8 shows a composition diagram of a device for backing up an unread short message in an Embodiment 5 of the present invention.

In an Embodiment 5 of the present invention, as shown in FIG. 8, a device for backing up an unread short message comprises:

a backup module configured to store, when a mobile communication terminal receives a new short message, the new short message in a terminal storage and back up the new short message to an subscriber identity card;

a synchronization module, configured to delete, when a user reads or deletes an unread short message stored in the terminal storage, a corresponding backup unread short message stored in the subscriber identity card.

Figure 9:
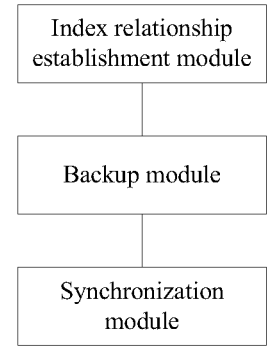
FIG. 9 shows a composition diagram of a device for backing up an unread short message in an Embodiment 6 of the present invention.

In an Embodiment 6 of the present invention, as shown in FIG. 9, a device for backing up an unread short message comprises:

an index relationship establishment module, configured to establish a corresponding table of an index relationship between a storage index of a short message in a terminal storage and a backup index of a short message in a subscriber identity card;

a backup module, configured to store, when a mobile communication terminal receives a new short message, the new short message in the terminal storage and back up the new short message to the subscriber identity card, and meanwhile establish a new item in the corresponding table of the index relationship;

a synchronization module, configured to delete, when a user reads or deletes an unread short message stored in the terminal storage, a corresponding backup unread short message stored in the subscriber identity card according to the corresponding table of the index relationship.

Figure 10:
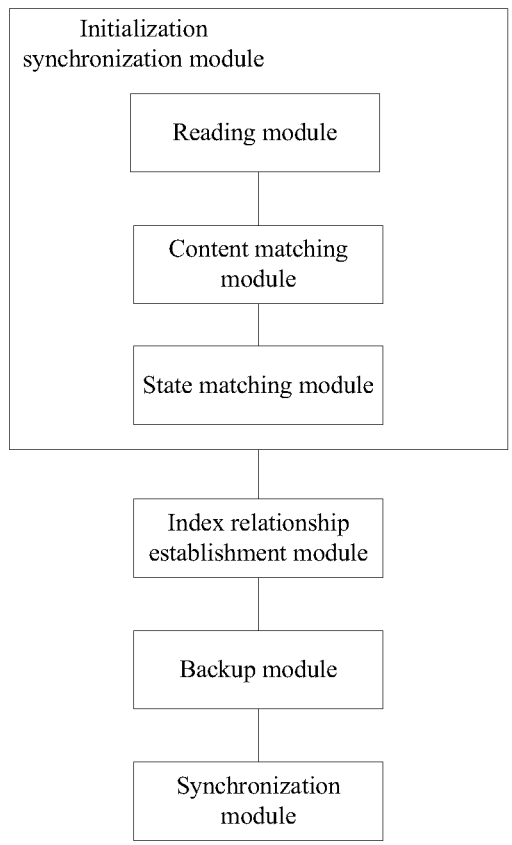
FIG. 10 shows a composition diagram of a device for backing up an unread short message in Embodiments 7 and 8 of the present invention.

In an Embodiment 7 of the present invention, as shown in FIG. 10, a device for backing up an unread short message comprises:

an initialization synchronization module, configured to periodically perform initialization synchronization on an unread short message in a terminal storage and in a subscriber identity card when a mobile communication terminal is powered on or powered off or when the mobile communication terminal is in an idle or standby mode; the initialization synchronization module specifically comprises the following three modules:

a reading module, configured to read an unread short message stored in the subscriber identity card and read all short messages in the terminal storage;

a content matching module, configured to: match, in terms of content, the unread short message stored in the subscriber identity card with all short messages stored in the terminal storage one by one; if no short message of the same content is found, set a state of the unread short message stored in the subscriber identity card as a received unread short message; if a short message of the same content is found, send the short message to a state matching module;

the state matching module, configured to: judge, in the short message of the same content, whether the state of the short message in the terminal storage is unread; if so, set the state of the unread short message stored in the subscriber identity card as a stored backup unread short message and establish a new item in a corresponding table of an index relationship; otherwise, delete the unread short message stored in the subscriber identity card;

an index relationship establishment module, configured to establish the corresponding table of the index relationship between a storage index of a short message in the terminal storage and a backup index of a short message in the subscriber identity card;

a backup module, configured to store, when the mobile communication terminal receives a new short message, the new short message in the terminal storage and back up the new short message to the subscriber identity card, and meanwhile establish a new item in the corresponding table of the index relationship;

a synchronization module, configured to delete, when a user reads or deletes the unread short message stored in the terminal storage, the corresponding backup unread short message stored in the subscriber identity card according to the corresponding table of the index relationship.

In an Embodiment 8 of the present invention, as shown in FIG. 10, a device for backing up an unread short message is similar to that in the Embodiment 7 in terms of composition and function, and the difference lies in that the reading module in the initialization synchronization module is further configured to acquire a capacity of the subscriber identity card, comprising a total capacity and an unused capacity, so as to get prepared for the backup module flexibly processing the backup operation according to the condition of capacity limit when writing in the subscriber identity card in the subsequent process. This embodiment can avoid transmitting an invalid request to the subscriber identity card and reducing the operation efficiency of program. The device for backing up the unread short message comprises the following components:

an initialization synchronization module, configured to periodically perform initialization synchronization on an unread short message in a terminal storage and in a subscriber identity card when a mobile communication terminal is powered on or powered off or when the mobile communication terminal is in an idle or standby mode; the initialization synchronization module specifically comprises the following three modules:

a reading module, configured to read an unread short message stored in the subscriber identity card and read all short messages in the terminal storage;

a content matching module, configured to: match, in terms of content, the unread short message stored in the subscriber identity card with all short messages stored in the terminal storage one by one; if no short message of the same content is found, set a state of the unread short message stored in the subscriber identity card as a received unread short message; if a short message of the same content is found, send the short message to a state matching module;

the state matching module, configured to: judge, in the short message of the same content, whether the state of the short message in the terminal storage is unread; if so, set the state of the unread short message stored in the subscriber identity card as a stored backup unread short message and establish a new item in a corresponding table of an index relationship; otherwise, delete the unread short message stored in the subscriber identity card;

an index relationship establishment module, configured to establish the corresponding table of the index relationship between a storage index of a short message in the terminal storage and a backup index of a short message in the subscriber identity card;

a backup module, configured to: when the mobile communication terminal receives a new short message, store the new short message in the terminal storage and then judge whether a capacity of the subscriber identity card is sufficient; if so, back up the new short message to the subscriber identity card and meanwhile establish a new item in the corresponding table of the index relationship; otherwise, give up backup;

a synchronization module configured to delete, when a user reads or deletes the unread short message stored in the terminal storage, the corresponding backup unread short message stored in the subscriber identity card according to the corresponding table of the index relationship.

An Embodiment 9 of the present invention provides a mobile communication terminal with a function of backing up an unread short message, which comprises a protocol stack, a short message management control module, a user interface, a subscriber identity card and a terminal storage, wherein the short message management control module comprises:

a backup module, configured to store, when the mobile communication terminal receives a new short message, the new short message in the terminal storage and back up the new short message to the subscriber identity card;

a synchronization module, configured to delete, when a user reads or deletes an unread short message stored in the terminal storage, a corresponding backup unread short message stored in the subscriber identity card.

An Embodiment 10 of the present invention provides a mobile communication terminal with a function of backing up an unread short message, which comprises a protocol stack, a short message management control module, a user interface, a subscriber identity card and a terminal storage, wherein the short message management control module comprises:

an initialization synchronization module, configured to periodically perform initialization synchronization on an unread short message in the terminal storage and in the subscriber identity card when the mobile communication terminal is powered on or powered off or when the mobile communication terminal is in an idle or standby mode; the initialization synchronization module specifically comprises the following three modules:

a reading module, configured to read an unread short message stored in the subscriber identity card and read all short messages in the terminal storage;

a content matching module, configured to: match, in terms of content, the unread short message stored in the subscriber identity card with all short messages stored in the terminal storage one by one; if no short message of the same content is found, set a state of the unread short message stored in the subscriber identity card as a received unread short message; if a short message of the same content is found, send the short message to a state matching module;

the state matching module, configured to: judge, in the short message of the same content, whether the state of the short message in the terminal storage is unread; if so, set the state of the unread short message stored in the subscriber identity card as a stored backup unread short message and establish a new item in a corresponding table of an index relationship; otherwise, delete the unread short message stored in the subscriber identity card;

an index relationship establishment module, configured to establish the corresponding table of the index relationship between a storage index of a short message in the terminal storage and a backup index of a short message in the subscriber identity card;

a backup module, configured to store, when the mobile communication terminal receives a new short message, the new short message in the terminal storage and back up the new short message to the subscriber identity card, and meanwhile establish a new item in the corresponding table of the index relationship;

a synchronization module, configured to delete, when a user reads or deletes the unread short message stored in the terminal storage, the corresponding backup unread short message stored in the subscriber identity card according to the corresponding table of the index relationship.

In the method and the device provided by the embodiments of the present invention for backing up an unread short message, the unread short message stored in the terminal storage is backed up to the subscriber identity card, when a user reads or deletes the unread short message stored in the terminal storage, the subscriber identity card is synchronized. The technical solution of the present invention is a function supplement for the receiving and storing process of a short message in the 3GPP protocol, and implements the backup of an unread short message by a method of extending the state bit of the short message, that is, adding the state of a stored backup unread short message when writing the short message, wherein the backup is transparent for a user. The present invention prompts the unread short message a user cares mostly to the user to the greatest extent allowed by the capacity of the subscriber identity card, so that the user will not miss the unread short message even when changing the mobile communication terminal, thereby improving the user experience. The present invention first writes the received short message in the terminal storage by default, since the terminal storage generally can be extended, the user is least limited by the capacity limit of the storage space when normally storing a short message.

Through the description of the embodiments, the technical means adopted in the embodiments of the present invention and the effects achieved thereby can be more deeply and concretely understood; however, the accompanying drawings are for reference and illustration in stead of limiting the present invention.

What is claimed is:

1. A method for backing up an unread short message, comprising:
   storing a new short message received by a mobile communication terminal in a terminal storage and backing up the new short message to a subscriber identity card; and
   when a user reads or deletes an unread short message stored in the terminal storage, deleting a backup unread short message, which is stored in the subscriber identity card, corresponding to the new short message.

2. The method according to claim 1, wherein the step of storing the new short message in the terminal storage and backing up the new short message to the subscriber identity card comprises:
   when the mobile communication terminal receives the new short message, writing the new short message in the terminal storage based on a state of a received unread short message, and then writing the new short message in the subscriber identity card based on a state of a stored backup unread short message; or
   when the mobile communication terminal receives the new short message, after writing the new short message in the terminal storage based on the state of the received unread short message, first judging whether a capacity of the subscriber identity card is sufficient, if so, writing the new short message in the subscriber identity card based on the state of the stored backup unread short message; otherwise, giving up backup.

3. The method according to claim 2, further comprising: periodically performing an operation of initialization synchronization on the unread short message in the terminal storage and in the subscriber identity card when the mobile communication terminal is powered on or powered off or when the mobile communication terminal is in an idle or standby mode, wherein the operation comprises:
   step 1: reading an unread short message stored in the subscriber identity card and reading all short messages in the terminal storage;
   step 2: matching, in terms of content, the unread short message stored in the subscriber identity card with all the short messages stored in the terminal storage one by one, if no short message of the same content is found, setting a state of the unread short message stored in the subscriber identity card as a received unread short message; if a short message of the same content is found, going to step 3;
   step 3: in a short message of the same content, judging whether a state of the short message in the terminal storage is unread, if so, setting the state of the unread short message stored in the subscriber identity card as a stored backup unread short message;
   otherwise, deleting the unread short message stored in the subscriber identity card.

4. The method according to claim 3, wherein before the mobile communication terminal receives the new short message, the method further comprises:
   establishing a corresponding table of an index relationship between a storage index of a short message in the terminal storage and a backup index of a short message in the subscriber identity card, for searching for a new short message stored in the subscriber identity card.

5. The method according to claim 1, wherein after deleting the backup unread short message, the method further comprises:
   modifying a state of the unread short message stored in the terminal storage as a received read short message.

6. The method according to claim 5, further comprising: periodically performing an operation of initialization synchronization on the unread short message in the terminal storage and in the subscriber identity card when the mobile communication terminal is powered on or powered off or when the mobile communication terminal is in an idle or standby mode, wherein the operation comprises:
   step 1: reading an unread short message stored in the subscriber identity card and reading all short messages in the terminal storage;
   step 2: matching, in terms of content, the unread short message stored in the subscriber identity card with all the short messages stored in the terminal storage one by one, if no short message of the same content is found, setting a state of the unread short message stored in the subscriber identity card as a received unread short message; if a short message of the same content is found, going to step 3;
   step 3: in a short message of the same content, judging whether a state of the short message in the terminal storage is unread, if so, setting the state of the unread short message stored in the subscriber identity card as a stored backup unread short message;
   otherwise, deleting the unread short message stored in the subscriber identity card.

7. The method according to claim 6, wherein before the mobile communication terminal receives the new short message, the method further comprises:
   establishing a corresponding table of an index relationship between a storage index of a short message in the terminal storage and a backup index of a short message in the subscriber identity card, for searching for a new short message stored in the subscriber identity card.

8. The method according to claim 1, further comprising: periodically performing an operation of initialization synchronization on the unread short message in the terminal storage and in the subscriber identity card when the mobile communication terminal is powered on or powered off or when the mobile communication terminal is in an idle or standby mode, wherein the operation comprises:
   step 1: reading an unread short message stored in the subscriber identity card and reading all short messages in the terminal storage;
   step 2: matching, in terms of content, the unread short message stored in the subscriber identity card with all the short messages stored in the terminal storage one by one, if no short message of the same content is found, setting a state of the unread short message stored in the subscriber identity card as a received unread short message; if a short message of the same content is found, going to step 3;
   step 3: in a short message of the same content, judging whether a state of the short message in the terminal storage is unread, if so, setting the state of the unread short message stored in the subscriber identity card as a stored backup unread short message; otherwise, deleting the unread short message stored in the subscriber identity card.

9. The method according to claim 8, wherein before the mobile communication terminal receives the new short message, the method further comprises:
   establishing a corresponding table of an index relationship between a storage index of a short message in the terminal storage and a backup index of a short message in the subscriber identity card, for searching for a new short message stored in the subscriber identity card.

10. A device for backing up an unread short message, comprising:
- a backup module, configured to store a new short message received by a mobile communication terminal in a terminal storage and back up the new short message to an subscriber identity card; and
- a synchronization module, configured to delete, when a user reads or deletes an unread short message stored in the terminal storage, a backup unread short message, which is stored in the subscriber identity card, corresponding to the new short message.

11. The device according to claim 10, further comprising:
- an index relationship establishment module, configured to establish a corresponding table of an index relationship between a storage index of a short message in the terminal storage and a backup index of a short message in the subscriber identity card, for searching for a new short message stored in the subscriber identity card.

12. The device according to claim 11, further comprising:
- an initialization synchronization module, configured to periodically perform initialization synchronization on the unread short message in the terminal storage and in the subscriber identity card when the mobile communication terminal is powered on or powered off or when the mobile communication terminal is in an idle or standby mode;

the initialization synchronization module comprises:
- a reading module, configured to: read an unread short message stored in the subscriber identity card and read all short messages in the terminal storage;
- a content matching module, configured to: match, in terms of content, the unread short message stored in the subscriber identity card with all the short messages stored in the terminal storage one by one; if no short message of the same content is found, set a state of the unread short message stored in the subscriber identity card as a received unread short message; if a short message of the same content is found, send the short message to a state matching module; and
- the state matching module, configured to: judge, in the short message of the same content, whether a state of the short message in the terminal storage is unread; if so, set the state of the unread short message stored in the subscriber identity card as a stored backup unread short message; otherwise, delete the unread short message stored in the subscriber identity card.

13. The device according to claim 12, wherein the reading module is further configured to acquire a capacity of the subscriber identity card, comprising a total capacity and an unused capacity;
- the backup module is further configured to: after storing the new short message received by the mobile communication terminal in the terminal storage, first judge whether the capacity of the subscriber identity card is sufficient; if so, back up the new short message to the subscriber identity card; otherwise, give up backup.

14. The device according to claim 10, further comprising:
- an initialization synchronization module, configured to periodically perform initialization synchronization on the unread short message in the terminal storage and in the subscriber identity card when the mobile communication terminal is powered on or powered off or when the mobile communication terminal is in an idle or standby mode;

the initialization synchronization module comprises:
- a reading module, configured to: read an unread short message stored in the subscriber identity card and read all short messages in the terminal storage;
- a content matching module, configured to: match, in terms of content, the unread short message stored in the subscriber identity card with all the short messages stored in the terminal storage one by one; if no short message of the same content is found, set a state of the unread short message stored in the subscriber identity card as a received unread short message; if a short message of the same content is found, send the short message to a state matching module; and
- the state matching module, configured to: judge, in the short message of the same content, whether a state of the short message in the terminal storage is unread; if so, set the state of the unread short message stored in the subscriber identity card as a stored backup unread short message; otherwise, delete the unread short message stored in the subscriber identity card.

15. The device according to claim 14, wherein the reading module is further configured to acquire a capacity of the subscriber identity card, comprising a total capacity and an unused capacity;
- the backup module is further configured to: after storing the new short message received by the mobile communication terminal in the terminal storage, first judge whether the capacity of the subscriber identity card is sufficient; if so, back up the new short message to the subscriber identity card; otherwise, give up backup.

16. A mobile communication terminal with a function of backing up an unread short message, comprising: a protocol stack, a short message management control module, a user interface, a subscriber identity card and a terminal storage, wherein the short message management control module comprises:
- a backup module, configured to store a new short message received by the mobile communication terminal in the terminal storage and back up the new short message to the subscriber identity card; and
- a synchronization module, configured to delete, when a user reads or deletes an unread short message stored in the terminal storage, a backup unread short message stored in the subscriber identity card corresponding to the new short message.

17. A mobile communication terminal with a function of backing up an unread short message, comprising: a protocol stack, a short message management control module, a user interface, a subscriber identity card and a terminal storage, wherein the short message management control module comprises:
- an initialization synchronization module, configured to periodically perform initialization synchronization on an unread short message in the terminal storage and in the subscriber identity card when the mobile communication terminal is powered on or powered off or when the mobile communication terminal is in an idle or standby mode;
- an index relationship establishment module, configured to establish a corresponding table of an index relationship between a storage index of a short message in the terminal storage and a backup index of a short message in the subscriber identity card;
- a backup module, configured to store a new short message received by the mobile communication terminal in the terminal storage and back up the new short message to the subscriber identity card, and meanwhile establish a new item in the corresponding table of the index relationship; and a synchronization module, configured to delete, when a user reads or deletes an unread short message stored in the terminal storage, a backup unread short message stored in the subscriber identity card corresponding to the new short message according to the corresponding table of the index relationship.

* * * * *